United States Patent
Thangarajah et al.

(10) Patent No.: US 10,984,482 B1
(45) Date of Patent: Apr. 20, 2021

(54) SYSTEMS AND METHODS FOR ENHANCED TRANSACTION DETAIL

(71) Applicant: Wells Fargo Bank, N.A., San Francisco, CA (US)

(72) Inventors: Sivesh Thangarajah, San Francisco, CA (US); Miranda Hill, Seattle, WA (US); Brian Pearce, Pleasanton, CA (US); Dominik Vltavsky, Belmont Street, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1027 days.

(21) Appl. No.: 14/925,488

(22) Filed: Oct. 28, 2015

Related U.S. Application Data

(60) Provisional application No. 62/072,382, filed on Oct. 29, 2014.

(51) Int. Cl.
*G06Q 40/00* (2012.01)
*G06Q 30/02* (2012.01)
*G06Q 50/00* (2012.01)

(52) U.S. Cl.
CPC ......... *G06Q 40/12* (2013.12); *G06Q 30/0201* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 8,060,423 B1 * | 11/2011 | Rukonic | G06Q 40/00 705/35 |
| 8,744,923 B1 * | 6/2014 | McKay | G06Q 30/0264 705/26.1 |
| 8,949,940 B1 * | 2/2015 | Shenoy | G06Q 10/10 726/4 |

(Continued)

FOREIGN PATENT DOCUMENTS

| | | | | |
|---|---|---|---|---|
| WO | WO-2009086266 A1 * | 7/2009 | | G06Q 30/02 |
| WO | WO-2010107587 A1 * | 9/2010 | | G06Q 20/10 |

(Continued)

OTHER PUBLICATIONS

Papadakis, George, et al. "Social media meta-API: leveraging the content of social networks." Proceedings of the 21st International Conference on World Wide Web. 2012. (Year: 2012).*

(Continued)

*Primary Examiner* — Matthew S Gart
*Assistant Examiner* — Derick J Holzmacher
(74) *Attorney, Agent, or Firm* — Foley & Lardner LLP

(57) ABSTRACT

A method for providing enhanced transaction detail for a financial transaction includes receiving transaction information for the financial transaction performed using a financial account held by an account holder, generating a transaction record for the financial transaction based on the transaction information, accessing a secondary account of the account holder, including identifying supplemental information for the financial transaction based on the transaction information, associating the supplemental information with the generated transaction record, and providing the transaction record, including the supplemental information, to the account holder.

19 Claims, 5 Drawing Sheets

(56) References Cited

U.S. PATENT DOCUMENTS

| | | | | |
|---|---|---|---|---|
| 2008/0082349 | A1* | 4/2008 | Zackrison | G06Q 50/01 705/319 |
| 2009/0070228 | A1* | 3/2009 | Ronen | G06Q 30/0601 705/26.1 |
| 2009/0171686 | A1* | 7/2009 | Eberstadt | G06Q 10/10 705/319 |
| 2009/0182674 | A1* | 7/2009 | Patel | G06Q 30/0603 705/72 |
| 2009/0259499 | A1* | 10/2009 | Bhojwani | G06Q 30/02 705/7.32 |
| 2009/0276346 | A1* | 11/2009 | Rukonic | G06Q 40/02 705/35 |
| 2011/0307403 | A1* | 12/2011 | Rostampour | G06Q 50/01 705/325 |
| 2012/0084135 | A1* | 4/2012 | Nissan | G06Q 30/06 705/14.38 |
| 2012/0158589 | A1* | 6/2012 | Katzin | G06Q 20/384 705/44 |
| 2012/0185544 | A1* | 7/2012 | Chang | G06F 16/2465 709/206 |
| 2012/0209677 | A1* | 8/2012 | Mehta | G06Q 20/3224 705/14.16 |
| 2012/0215597 | A1* | 8/2012 | Ross | G06Q 30/0201 705/14.1 |
| 2012/0303425 | A1* | 11/2012 | Katzin | G06Q 20/32 705/14.4 |
| 2013/0117108 | A1* | 5/2013 | Spears | G06Q 30/0255 705/14.53 |
| 2013/0144785 | A1* | 6/2013 | Karpenko | G06Q 20/425 705/44 |
| 2013/0166332 | A1* | 6/2013 | Hammad | G06Q 20/12 705/5 |
| 2013/0211913 | A1* | 8/2013 | Ross | G06Q 40/025 705/14.53 |
| 2013/0218657 | A1* | 8/2013 | Salmon | G06Q 20/381 705/14.29 |
| 2013/0231974 | A1* | 9/2013 | Harris | G06Q 30/0201 705/7.29 |
| 2014/0025461 | A1* | 1/2014 | Knowles | G06Q 30/0222 705/14.23 |
| 2014/0164199 | A1* | 6/2014 | Wilkes | G06Q 50/01 705/35 |
| 2014/0279068 | A1* | 9/2014 | Systrom | G06Q 30/0269 705/14.73 |

FOREIGN PATENT DOCUMENTS

| | | | | |
|---|---|---|---|---|
| WO | WO-2014047162 | A1 * | 3/2014 | G06Q 20/384 |
| WO | WO-2015048181 | A1 * | 4/2015 | G06Q 30/02 |

OTHER PUBLICATIONS

Liftman, Justin, et al. "API-based social media collecting as a form of web archiving." International Journal on Digital Libraries 19.1 (2018): 21-38. (Year: 2018).*

Culnan, Mary J., Patrick J. McHugh, and Jesus I. Zubillaga. "How large US companies can use Twitter and other social media to gain business value." MIS Quarterly Executive 9.4 (2010). (Year: 2010).*

Hansen, Jared M., George Saridakis, and Vladlena Benson. "Risk, trust, and the interaction of perceived ease of use and behavioral control in predicting consumers' use of social media for transactions." Computers in Human Behavior 80 (2018): 197-206. (Year: 2018).*

Aru, Okereke Eze, and Ihekweaba Gozie. "Facial verification technology for use in ATM transactions." American Journal of Engineering Research (AJER) 2.5 (2013): 188-193. (Year: 2013).*

* cited by examiner

SYSTEMS AND METHODS FOR ENHANCED TRANSACTION DETAIL

CROSS-REFERENCE TO RELATED APPLICATIONS

This application claims priority to U.S. Provisional Patent Application Ser. No. 62/072,382, entitled "Systems and Methods for Enhanced Transaction Detail," filed on Oct. 29, 2014, which is incorporated herein by reference in its entirety and for all purposes.

BACKGROUND

The present disclosure relates generally to the processing of transaction information. More specifically, the present disclosure relates to systems and methods for providing enhanced transaction detail for financial statements.

Financial institutions provide financial statements to account holders, which may include a record of transactions that are performed by an account holder over a designated time period. For instance, the financial institution may receive information related to the transaction in order to process or otherwise facilitate the transaction for the account holder. The financial institution may then generate a record for the transaction based on the information received. Transaction records may be provided for transactions that are performed by the account holder through the use of payment cards (e.g., credit cards, debit cards, and prepaid cards), checks and money orders, and other payment methods.

The transaction record that is provided for a particular transaction may vary depending on the information that is received by the financial institution. The transaction record will typically include at least the amount of the transaction, a date associated with the transaction, and whether the transaction was a debit or a credit. The transaction record may also include an identifier for the other party to the transaction (e.g., the merchant). However, the account holder may be unable to identify the transaction based on the limited information that is provided. For instance, the transaction record may be posted to the account days after the account holder initiated the transaction, such that the account holder is unable to identify the transaction based on the date provided. Further, even if the transaction record includes an identifier for a merchant, the identifier may be a merchant code or generic description that is difficult for the account holder to decipher.

SUMMARY

One embodiment of the present disclosure relates to a computer-implemented method for providing enhanced transaction detail for a financial account. The method includes receiving information related to a financial transaction, generating a record for the transaction based on the transaction information, searching a secondary account associated with the transaction for supplemental transaction information, importing the supplemental information, adding the supplemental information to the transaction record, aggregating the transaction record with one or more other transaction records, and analyzing the aggregated transaction records based on a financial goal of an account holder.

Another embodiment of the present disclosure relates to a system for providing enhanced transaction detail for a financial account. The system includes a financial institution computer system configured to communicate with an account holder computer system and a secondary account computer system via network interface logic. The financial institution computer system includes a financial statement generator configured to generate an enhanced record for a transaction by importing supplemental information from an associated secondary account. The financial institution computer system also includes transaction profile logic configured to aggregate two or more enhanced transaction records and analyze the aggregated transaction records based on a financial goal of an account holder.

Another embodiment of the present disclosure relates to a computer-implemented method performed by one or more processors of a financial institution computer system. The method includes receiving, by the financial institution computer system, transaction information for a financial transaction of an account holder, generating, by the financial institution computer system, a transaction record for the financial transaction based on the transaction information, accessing, by the financial institution computer system, a secondary account of the account holder, including identifying supplemental information for the financial transaction based on the transaction information, associating, by the financial institution computer system, the supplemental information with the generated transaction record, and providing, by the financial institution computer system, a user interface to a device of the account holder, the user interface including the transaction record having the supplemental information.

Another embodiment of the present disclosure relates to a computer-implemented method performed by one or more processors of a financial institution computer system. The method includes receiving, by the financial institution computer system, transaction information for a financial transaction of an account holder, generating, by the financial institution computer system, a transaction record for the financial transaction based on the transaction information, determining, by the financial institution computer system, supplemental information that is required for the transaction record, locating, by the financial institution computer system, the supplemental information for the financial transaction by searching one or more secondary accounts of the account holder based on the transaction information, associating, by the financial institution computer system, the supplemental information with the generated transaction record by applying the supplemental information to the record template, and providing, by the financial institution computer system, a user interface to a device of the account holder, the user interface including the transaction record having the supplemental information.

Another embodiment of the present disclosure relates to a computer-implemented method performed by one or more processors of a financial institution computer system. The method includes receiving, by the financial institution computer system, transaction information for a financial transaction of an account holder, generating, by the financial institution computer system, a transaction record for the financial transaction based on the transaction information, identifying, by the financial institution computer system, a satisfaction level associated with the financial transaction by accessing a secondary account of the account holder, associating, by the financial institution computer system, the satisfaction level with the generated transaction record, and providing, by the financial institution computer system, a user interface to a device of the account holder, the user interface including the transaction record having the satisfaction level associated with the financial transaction.

BRIEF DESCRIPTION OF THE FIGURES

The details of one or more implementations are set forth in the accompanying drawings and the description below.

Other features, aspects, and advantages of the disclosure will become apparent from the description, the drawings, and the claims, in which:

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for providing enhanced detail for a financial transaction are shown. In particular, the figures include a transaction processing system configured to provide an enhanced transaction record to an account holder. The transaction processing system includes a financial institution computer system configured to communicate with an account holder computer system and a secondary account computer system to receive information related to the transaction. The financial institution computer system includes a financial statement generator configured to generate an enhanced record for a transaction by importing supplemental information from an associated secondary (e.g., non-financial) account. The financial institution computer system also includes transaction profile logic configured to aggregate two or more enhanced transaction records and analyze the aggregated transaction records based on a financial goal of an account holder.

Figure 1:
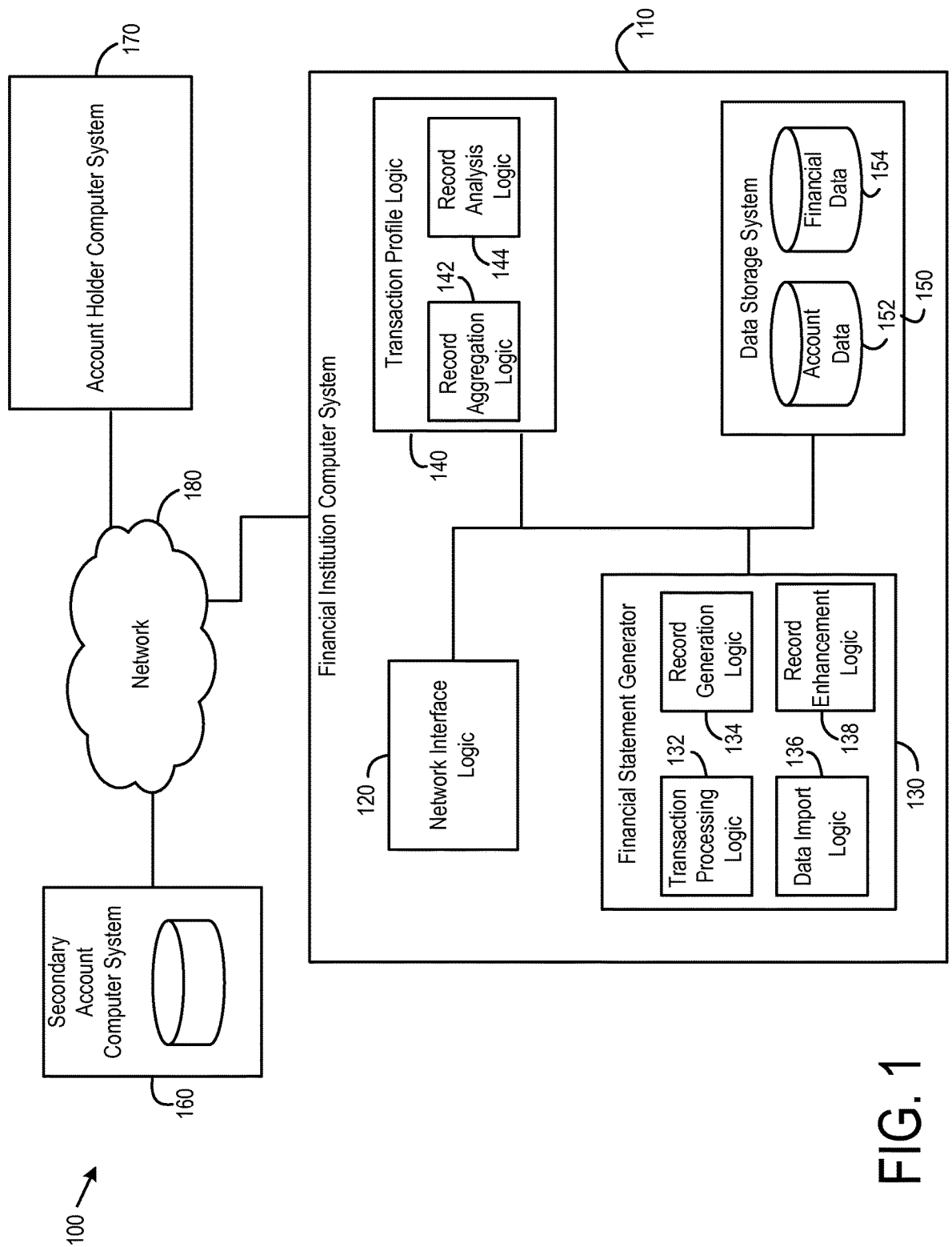
FIG. 1 is a schematic diagram of a system for providing enhanced transaction detail for a financial account, according to an example embodiment.

Referring to FIG. 1, a transaction processing system 100 is shown, according to an example embodiment. The transaction processing system 100 may be used to process a transaction and provide an enhanced financial statement related to the transaction. The transaction processing system 100 is configured to receive information related to a transaction and generate a record for the transaction based on the information. The system 100 is further configured to retrieve supplemental transaction information from a secondary account or source associated with the transaction and enhance the transaction record by associating the supplemental information with the transaction record. The system 100 may include, among other systems, a financial institution computer system 110, a secondary account computer system 160, and an account holder computer system 170.

In an example embodiment, the financial institution computer system 110 may be provided by a financial institution, such as a bank. The financial institution computer system 110 is configured to provide a financial statement, including transaction information, for one or more financial accounts held by a user (i.e., an account holder). The account holder may be a customer of the financial institution that accesses the financial institution computer system 110 through tellers at retail bank branches, through an online banking area provided by the financial institution, or otherwise. For instance, the account holder may access the financial institution computer system 110 using the account holder computer system 170, which may include a user device such as a smart phone or other mobile device.

In an example embodiment, the financial institution computer system 110 provides a payment account for the account holder, such as a checking or credit card account. The payment account may be used by the account holder to perform various financial transactions, such as in exchange for goods or services received from a merchant. In this embodiment, the financial institution computer system 110 is configured to receive transaction information related to transactions performed using the payment account and provide a record of each transaction. The transaction record may include various identifying information for the transaction, including a payment amount, identifying information for the payor and/or the payee, location information, and a time stamp for the transaction.

The financial institution computer system 110 may receive transaction information from the account holder or from another party to the transaction, such as a merchant. The financial institution computer system 110 includes network interface logic 120, which may be used to establish connections with other components of the system 100, including the account holder computer system 170 and the secondary account computer system 160, by way of network 180. For example, network interface logic 120 may comprise one or more web servers that provide a graphical user interface (e.g., a series of dynamically-generated web pages) for users that access the financial institution computer system 110 through an online platform. In an example embodiment, the account holder is able to access the financial institution computer system 110 via the network interface logic 120 to review financial statements generated by the financial institution computer system 110. For mobile devices such as cell phones, network interface logic 120 may comprise servers that provide a user interface accessible as a mobile website or via an application executing on the client device.

The financial institution computer system 110 includes a financial statement generator 130 configured to receive transaction information for an account and generate a financial statement for the account based on the transaction information. The financial statement may include a record of each transaction (i.e., a transaction record) that includes information identifying the transaction to the account holder. The transaction record may also include other information associated with the transaction, such as any information provided by any of the parties to the transaction. For instance, each transaction record may include information related to a transaction amount, an account associated with the transaction, a merchant identifier or other identifying information for any parties involved in the transaction, location information for the transaction, a date (i.e., time) of the transaction, and other identifying information that may be necessary to process the transaction. At least a portion of the transaction record may be generated based on information provided by the account holder or other parties to the transaction.

In an example embodiment, the financial statement generator 130 may also retrieve (i.e., import) other information related to the transaction (e.g., from the secondary account computer system 160) based on the information provided to the system 110. For instance, the financial statement generator 130 (i.e., the financial institution computer system 110) may be configured to access other accounts (e.g., social networking accounts, data storage accounts, other financial accounts, etc.) held by the account holder and retrieve supplemental transaction information from the secondary accounts based on the transaction. In one example embodiment, the financial statement generator 130 is configured to access a linked social networking account of the account holder in order to retrieve status information related to the transaction. The financial statement generator 130 may then associate the related status information with the transaction record to provide further transaction detail to the account holder.

In the example embodiment of FIG. 1, the financial statement generator 130 includes transaction processing logic 132, record generation logic 134, data import logic 136, and record enhancement logic 138. Such logic may be implemented in a machine (e.g., one or more networked computer servers) comprising machine-readable media having instructions stored therein which are executed by the machine to perform the operations described herein. For instance, such logic may be implemented and executed to retrieve information related to a particular transaction and attach the information to the record for the transaction.

The transaction processing logic 132 may be executed to process a transaction associated with the account holder. For instance, the account holder may request a payment to a merchant using the payment account provided by the financial institution computer system 110. In an example embodiment, the transaction processing logic 132 receives the request to process the payment (e.g., from the account holder computer system 170), which may include information related to the payment (i.e., transaction) such as a payment amount and a recipient identifier, and processes the payment from the payment account based on the transaction information. The request may be received at the financial institution computer system 110 via the network interface logic 120.

The transaction processing logic 132 may also be configured to process information received as part of the transaction for use in generating the transaction record. For instance, the transaction processing logic 132 may be configured to, when executed, receive a payment request from the account holder or another entity and extract transaction information from the request for use in generating a transaction record. The transaction information that is processed may include a payment amount, identifying information for any of the parties to the transaction, a time stamp for the transaction, or other information that may be useful in identifying the transaction to the account holder. The transaction information may be received from the account holder computer system 170 as part of a payment request received from the account holder, or upon request by the financial institution computer system 110. Similarly, the financial institution computer system 110 may be configured to receive transaction information from a computer system of a merchant in order to process a transaction between the account holder and the merchant.

The record generation logic 134 may be executed to generate a record for a particular transaction. The transaction record is intended to provide transaction information to the account holder that is sufficient to identify and recall a particular transaction. In an example embodiment, the transaction record is generated based on a template. For instance, the record generation logic 134 may include a template with fields for specified information that is relevant to the transaction. The template may be generated or modified by the account holder such that information requested by the account holder is provided for each transaction, if available. The template for the transaction record may be visible to the account holder via a graphical user interface that is displayed through the account holder computer system 170. The account holder may be able to adjust or modify the display of the transaction record via the network interface logic 120.

The transaction record may include information that is provided to the financial institution computer system 110 as part of a transaction request, which may include basic identifying information. The transaction record may also include information that is provided upon request. For instance, the record generation logic 134 may be configured to request additional information from the account holder when transaction information is received, such as any information required by the template that is not found within the transaction information. The transaction record may be provided to the account holder as part of a financial statement.

The data import logic 136 may be executed to import additional (i.e., supplemental) transaction data for use in generating the transaction record. In an example embodiment, the financial statement generator 130 is configured to identify when a transaction is initiated or when information related to a transaction is received at the financial institution computer system 110. At this time, the data import logic 136 may seek additional information related to the transaction in order to provide further transaction information to the account holder. The data import logic 136 may seek specific information to supplement the transaction record. In an example embodiment, for instance, the data import logic 136 may seek specific information in order to fill certain fields of the transaction record template. The data import logic 136 may also seek specific information in order to otherwise complete or supplement the transaction record. For instance, the data import logic 136 may seek additional information in order to identify any parties to the transaction, identify a date on which the transaction occurred, identify a particular purpose for the transaction, or to identify any other information that may be useful to or desired by the account holder.

The data import logic 136 may be configured to import supplemental transaction information from other accounts associated with the account holder. In the example embodiment of FIG. 1, the secondary account computer system 160 is representative of a secondary account that is held by or otherwise associated with the account holder. The secondary account may include social networking accounts, email accounts, other financial accounts, receipt storage accounts, and other types of storage accounts such as a cloud computing system. In an example embodiment, the secondary accounts are linked to the payment account provided by the financial institution computer system 110, such that the data import logic 136 is granted permanent access to the secondary accounts. In other embodiments, the financial institution computer system 110 is configured to request access to the secondary accounts via the network interface logic 120. For instance, the data import logic 136 may send a request to the account holder to access any secondary accounts held by the account holder upon receiving an indication that a transaction has occurred. Any available supplemental information may then be automatically added to the transaction record. In other embodiments, the request to access a secondary account may be sent to the account holder in response to an event or occurrence, such as when additional information is required for the transaction record.

In an example embodiment, the data import logic 136 is configured to access and search a social networking account of the account holder in order to obtain supplemental information related to a particular transaction. The data import logic 136 may search for status updates and other posts that are related to the transaction and associate the supplemental information found with the transaction. For instance, the data import logic 136 may search a social networking account of the account holder based on one or more details of the transaction, such as a location of the transaction, identifying information related to another party to the transaction, a time stamp for the transaction, a payment amount, or any other identifying information. If information is found within the secondary account that matches any known transaction information, the information may be imported by the financial institution computer system 110 (i.e., data import logic 136) for use in generating or enhancing the transaction record. The information, and any associated (e.g., supplemental) information, may be automatically imported based on a match with one or more transaction details. In one embodiment, the supplemental information is identified by the data import logic 136. The account holder may also have an opportunity to approve the supplemental information before the information is imported or otherwise added to the transaction record. For instance, the account holder may confirm that the supplemental information found by the data import logic 136 is indeed associated with the transaction.

The supplemental information that is imported from the secondary account of the account holder may include identifying information for the transaction, such as the information discussed herein. The identifying information may be added to the transaction record in order to assist in identifying the transaction to the account holder within the financial statement. Identifying information may include a photo that was posted to a social networking account, the name of a merchant, location information for a merchant, and a time stamp for a particular post mentioning information related to the transaction. As an example, a social networking update (e.g., a Facebook post or a Tweet) by the account holder may be matched to a financial transaction by matching information within the update (e.g., date, a timestamp, a vendor or merchant, location, associated parties, etc.) to similar information known about the transaction. The information may be accessed by the data import logic 136 using an application programming interface (API) that enables the financial institution computer system 110 to communicate directly with the social networking site. Once the update is matched to the transaction, the update, and any (supplemental) information within the update may be imported to the transaction record and stored. For instance, any associated media (e.g., pictures, videos, gifs, etc.), data related to a review or satisfaction level of the account holder, and personal identifying information may be imported to the transaction record. The data import logic 136 may also be utilized to import information from another person's social networking account. For instance, an update (e.g., post) in which the account holder is "tagged," or otherwise identified, may be imported based on matching information within the update. Any media in which the account holder is tagged may also be imported to the transaction record. The additional imported information may then be provided to the account holder as part of an enhanced account statement.

The supplemental information may also include other information that may be useful as part of the financial statement for purposes other than identifying the transaction. For instance, the supplemental information may identify other parties (e.g., persons, groups, companies, etc.) that were present at the time of the transaction. Any parties that are identified by the account holder as being associated with the transaction (e.g., present at a meal, sporting event, or other activity) may be contacted by the financial institution computer system 110. The associated parties may be contacted using a channel (e.g., an API) associated with the secondary account. For instance, if an associated party is identified via a social networking site, the associated party may be contacted by the financial institution computer system 110 using a messaging system of the social networking site. The financial institution computer system 110 may also contact the associated party (or the account holder) using an API that connects the financial institution computer system 110 to the social networking site. The associated party may be requested to verify or approve the additional information related to the financial transaction. The associated party may also be requested to provide any additional information that may be used to supplement the transaction record.

The identity of the other parties associated with the transaction may also be used to supplement other user accounts that are provided by the financial institution computer system 110. The other parties may also be added to the transaction record of the account holder in order to associate the transaction with a particular person or group of persons. In one embodiment, the financial institution computer system 110 generates an expense report (e.g., at the account holder's request) to include any persons associated with the financial transaction, as well as any other relevant information.

The supplemental information may also identify a set of emotions (i.e., emotional information) associated with a particular transaction. The emotional information may be determined by the financial statement generator 130 based on input provided to the secondary account by the account holder or an associated party. For instance, the data import logic 136 may be configured to determine a satisfaction level for a transaction (i.e., whether the transaction was part of a positive or negative experience for the account holder) based on information found within a secondary account. The satisfaction level for a particular transaction may be determined on a binary basis (i.e., positive or negative), or the data import logic 136 may determine a score based on a predetermined range (e.g., 0 to 100) intended to rank the transactions based on the attached emotional indicators. The data import logic 136 may then label the transaction as such within the transaction record.

In an example embodiment, the data import logic 136 determines a satisfaction level for a transaction based on words or phrases found in a social media post associated with the transaction. If more words are found that are typically associated with a positive experience (e.g., good, fun, happy, delicious, etc.) or a negative experience (e.g., bad, terrible, sad, etc.), the transaction may be labeled as such. The data import logic 136 may also determine a satisfaction level for the transaction by scanning (e.g., using facial recognition software) associated media (e.g., images, videos, etc.) within the post. For instance, if the account holder has a particularly positive facial expression in an associated image, the satisfaction level for the transaction could be increased. The facial expressions of other identified persons could also be included in determining the satisfaction level for the transaction.

The data import logic 136 may also determine the satisfaction level based on prior posts of the account holder. For instance, the data import logic 136 may analyze prior posts by the account holder to determine the words, phrases, or facial expressions that the account holder typically associates with a positive or negative experience. These indicators may be labeled as positive or negative based on an associated rating for the transaction (i.e., words, phrases, or expressions found in a post associated with a positive rating could be given a positive connotation in future posts). The indicators may then be applied to a current post associated with a transaction (i.e., used as a key) to determine a satisfaction level for the transaction. The supplemental information may also be associated with a user review associated with the transaction. For instance, the secondary account may include an account used to review restaurants or merchants, and a review that is related to the transaction may be associated with the transaction and displayed within the transaction record.

In another embodiment, the secondary account is an email account held by the account holder. The data import logic 136 may search the associated email account for keywords or phrases based on the transaction information already received. Any emails found by the data import logic 136 may be imported and stored within the transaction record. The information within the emails may also be imported and separately stored within the transaction record, such as to fill any fields of the transaction record template. For instance, if a person is emailed regarding a dinner reservation that matches a transaction (e.g., by date, time, location, restaurant, occasion, etc.), the person may be added to the transaction record. The data import logic 136 may also add any other information found within the email, which may include an occasion associated with the restaurant transaction (e.g., a birthday, anniversary, business function, etc.), any other parties that are to be present, a payment agreement (e.g., split bill), or a satisfaction level provided by either party.

In one embodiment, the data import logic 136 is configured to search an email account for receipts associated with the transaction. For instance, some merchants may automatically send a receipt for the transaction to the account holder upon completion of the transaction. The data import logic 136 may be configured to import the receipt and associate the receipt with the transaction. The data import logic 136 may also import the data within the receipt in order to fill the transaction record. The data import logic 136 may search an email account of the account holder based on any details of the transaction. The data import logic 136 may identify the email account of the account holder based on information provided by the account holder, such as an email address already associated with the payment account provided by the financial institution computer system 110. The data import logic 136 may also identify the email account of the user based on transaction information, such as an email address found on a receipt associated with the transaction. The data import logic 136 may be configured to request permission from the account holder prior to searching an email account of the user or importing any data from the account holder's email account.

The secondary account may also be a storage account held by or otherwise associated with the account holder. For instance, the secondary account may be a cloud-based storage account. In an example embodiment, the storage account is a receipt storage account configured to automatically receive receipts for various purchases made by the account holder. The storage account may also be found on a device of the account holder, such as the account holder computer system 170. In one embodiment, the data import logic 136 is configured to search the account holder computer system 170 and import any information related to a particular transaction.

The record enhancement logic 138 may be executed to add any supplemental information to the transaction record. The record enhancement logic 138 may be configured to associate supplemental information with a transaction record based on similar or matching identifying information. In one embodiment, the supplemental information that is found and imported is automatically added to the transaction record based on similar characteristics of the transaction information already received and the newly imported supplemental information. The supplemental information may be used as a second factor for authentication purposes. For instance, the financial institution computer system 110 may include as an input to a risk decision engine any supplemental information that is identified. The supplemental information may provide additional assurance to the financial institution computer system 110 that a requested financial transaction is legitimate (e.g., is authenticated).

The record enhancement logic 138 may be configured to add the supplemental information to the transaction record that is shown to the account holder in the financial statement, such as to add the supplemental information to the transaction record template that is provided. For instance, basic identifying information that is imported by the data import logic 136 may be shown within the financial statement displayed to the account holder. Depending on relevance and the preferences of the account holder, other supplemental information may be stored within the transaction record such that the account holder is required to request (e.g., scroll over, select, "click," etc.) the supplemental information to be shown.

The financial institution computer system 110 also includes transaction profile logic 140 configured to generate a profile for the account holder based on the transaction records generated by the financial statement generator 130. In the example embodiment of FIG. 1, the transaction profile logic 140 includes record aggregation logic 142 and record analysis logic 144. Such logic may be implemented in a machine (e.g., one or more networked computer servers) comprising machine-readable media having instructions stored therein which are executed by the machine to perform the operations described herein. For instance, such logic may be implemented and executed to generate a profile for the account holder based on the transaction records generated by the financial statement generator 130.

The record aggregation logic 142 may be executed to aggregate the transaction records generated by the financial statement generator 130. For instance, the transaction records may be aggregated based on one or more characteristics of the transaction records, such as a payment amount, an identity of one or more parties to the transaction, a category for the merchant or the type of goods or services purchased, a payment type, a time of purchase, or any other information that is provided as part of the transaction record. The record aggregation logic 142 may also aggregate the transaction records based on one or more characteristics specified by the account holder. For instance, the account holder may provide financial goals to the financial institution computer system 110 and the record aggregation logic 142 may be configured to aggregate the transaction records that are generated based on the provided financial goals. As an example, the account holder may wish to identify any transactions associated with a negative or positive experience based on information received via secondary accounts. The record aggregation logic 142 may be configured to aggregate transaction records accordingly in order to provide the desired information to the account holder.

The record analysis logic 144 may be executed to analyze the transaction records, including the records that are aggregated by the record aggregation logic 142. The record analysis logic 144 may be configured to analyze the transaction records according to certain financial goals that are established by the account holder. For instance, the account holder may choose to limit the amount of funds spent on a certain activity or spent with a particular type of merchant. The record analysis logic 144 may be configured to determine whether the user has met a particular financial goal over a designated time period or whether the user is on a pace to meet or fall short of a particular goal. The record analysis logic 144 may also be configured to identify trends within the aggregated transaction records, such as by identifying when unwanted transactions (i.e., transactions that negatively impact set financial goals, transactions associated with a negative experience, etc.) tend to occur.

The financial institution computer system 110 also includes a data storage system 150. The data storage system 150 may include information related to past transactions, the account holder or the account holder computer system 170, the secondary account computer system 160, and the financial institution computer system 110, including any information described herein. As shown in the example embodiment of FIG. 1, the data storage system 150 may include account data 152, which includes data related to account holders, such as profile information and user preferences. The data storage system 150 may also include financial data 154, which may include any transaction information received or generated by the financial institution computer system 110.

Figure 2:
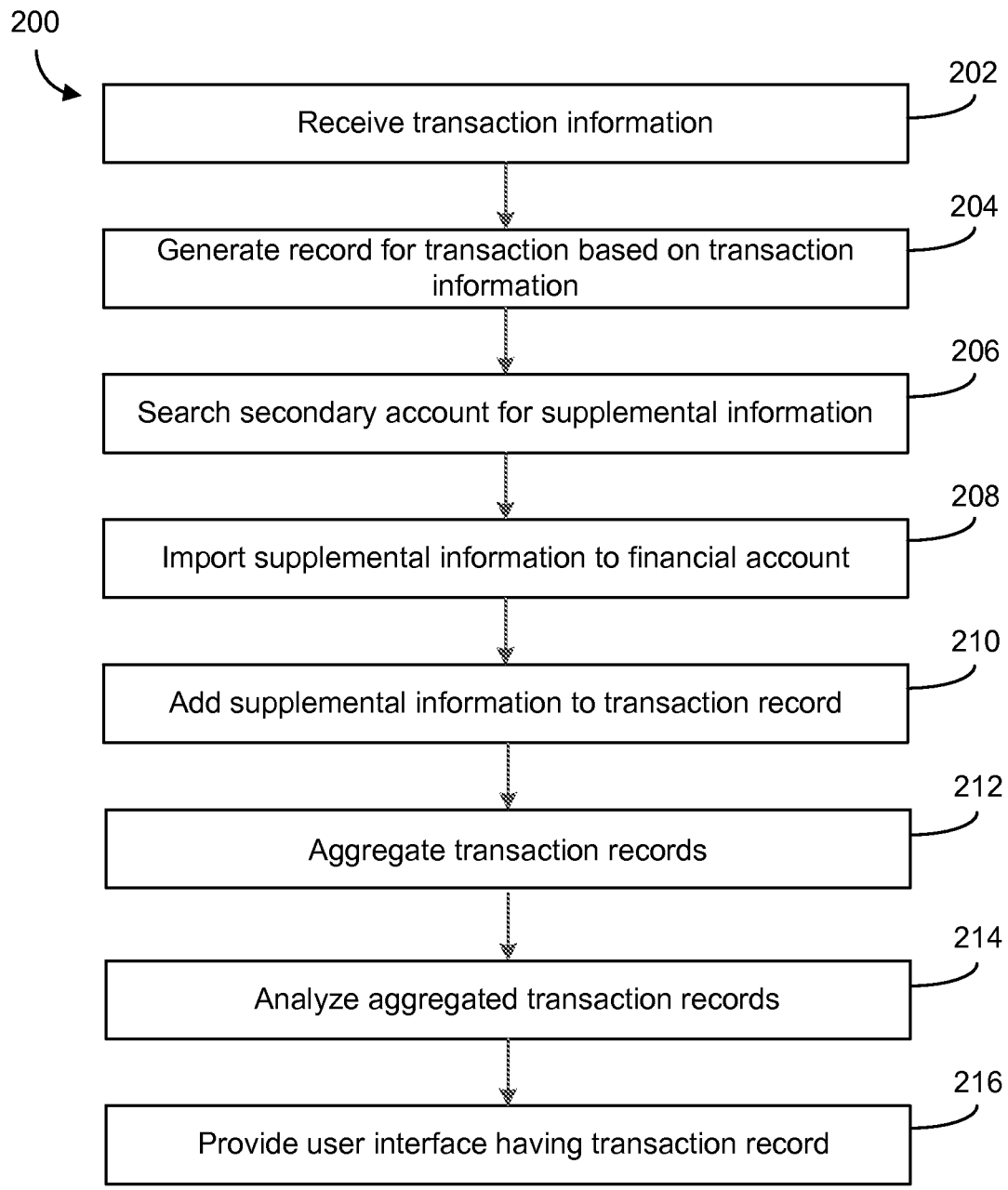
FIG. 2 is a schematic flow diagram of an example process that may be implemented using the system shown in FIG. 1.

Referring now to FIG. 2, a process 200 is shown for generating an enhanced financial statement, including a transaction record having enhanced detail. The process 200 may be performed using the financial institution computer system 110 shown in FIG. 1. More specifically, the process 200 may be performed using the financial statement generator 130 and/or the transaction profile logic 140 of the financial institution computer system 110. For instance, the account holder sends a request for a transaction to the financial institution computer system 110 via the account holder computer system 170. The request may include various information related to the transaction, such as a payment amount, a recipient identifier, and other identifying information. The financial institution computer system 110 may process the transaction according to the request, which may include generating a record for the transaction based on the information that is received. The financial institution computer system 110 may then search secondary accounts associated with the account holder for supplemental information related to the transaction, which may be included as part of the transaction record and provided to the account holder.

At 202, transaction information is received. The transaction information may be received at the financial institution computer system 110 as part of a request to process a transaction between the account holder and a merchant. The transaction information may include any information disclosed herein and related to the transaction, including any information necessary to process the transaction from the payment account provided by the financial institution computer system 110. In other embodiments, the transaction information may be received from a merchant or another party to the transaction. The transaction information may also be received in response to a request from the financial institution computer system 110, such as information that was not initially provided but is necessary to process the transaction.

At 204, a record is generated for the transaction. The record may be generated by the financial statement generator 130 (i.e., the financial institution computer system 110). The record may be generated based on the transaction information received at 202. The record may be generated based on a template that is provided or modified by the account holder, such that the transaction record includes information desired by the account holder. The transaction record may include information that is necessary or desired to identify a particular transaction. The transaction record may be provided as part of a financial statement that is accessible or otherwise provided to the account holder. The transaction record may include a portion that is always visible to the account holder within a graphical user interface, as well as a hidden portion including more detailed information that is provided to the account holder upon request. The transaction record may be generated using the transaction information that is received from the account holder, and may also include information that is derived (i.e., by the financial statement generator 130) based on the transaction information.

At 206, a secondary account associated with the account holder (i.e., the secondary account computer system 160) is searched for supplemental information related to the transaction. The secondary account may be searched by the financial statement generator 130 (i.e., the financial institution computer system 110). The secondary account may be linked to the payment account provided by the financial institution computer system 110, such that the system 110 is provided with permanent access to the secondary account. The secondary account may include social networking accounts, storage accounts, other financial accounts, product review accounts, and other accounts associated with the account holder. The secondary account may be searched based on information that is required to process the requested transaction. For instance, if the financial institution computer system 110 is unable to process a requested transaction based on the information provided, the system 110 may search secondary accounts associated with the account holder for the information required to proceed with the transaction. In one embodiment, secondary account is searched by the financial statement generator 130 upon approval or confirmation by the account holder.

The secondary account may also be searched for any supplemental transaction information that may be useful or required for the financial statement generator 130. For instance, the financial statement generator 130 may be configured to search a social networking account associated with the account holder in order to obtain supplemental information associated with the transaction, such as from photos, status updates, or other posts found in the account of the account holder. The financial statement generator 130 may be configured to search for supplemental transaction information based on transaction information already associated with the transaction, such as information received from the account holder with the transaction request. The financial statement generator 130 may search for keywords or other matching characteristics within a secondary account to locate supplemental information related to a particular transaction.

At 208, the supplemental information related to the transaction is imported to the financial institution computer system 110. The supplemental transaction information may be automatically imported to the financial institution computer system 110, or may be imported upon approval or confirmation by the account holder.

At 210, the supplemental information is added to the transaction record related to the particular transaction. The financial statement generator 130 (i.e., the financial institution computer system 110) may add the supplemental information to the transaction record. The supplemental information may be added based on the transaction record template. The supplemental information may be added in whole or in part. For instance, any documents (e.g., receipts, emails, etc.) that are imported to the financial institution computer system 110 may be stored as documents within the transaction record. The account holder may be able to download or view the attached documents via the network interface logic 120 and the account holder computer system 170. The financial statement generator 130 (i.e., the record enhancement logic 138) may also be configured to interpret the documents that are imported to the financial institution computer system 110 and fill the transaction record with any information found within the documents. For instance, information found on any imported documents may be used to fill a field of the transaction record template and made visible to the account holder. The transaction record may be updated to include all supplemental information that is retrieved from the secondary account, or selected portions. For instance, the account holder may provide preferences for the presentation of the transaction record and the supplemental information may be added to the transaction record based on the preferences of the account holder.

At 212, the enhanced transaction record may be aggregated within one or more other transaction records that are associated with the payment account of the account holder. For instance, the transaction records may be aggregated based on one or more characteristics of the associated transaction, such as a payment amount, a payment type, a transaction category, or another characteristic selected by the account holder or otherwise determined by the transaction profile logic 140 (i.e., the financial institution computer system 110). The transaction records may be aggregated in order to provide an overview of the transaction history of the account holder, such as to interpret a current financial health of the account holder.

At 214, the aggregated transaction records may be analyzed. The records may be analyzed according to a financial goal of the account holder. For instance, the account holder and/or the financial institution computer system 110 may provide certain financial goals for the account holder and the transaction records may be analyzed to determine whether the financial goals are being met. The record analysis logic 144, for instance, may analyze the transaction records and generate recommended actions for the account holder based on the provided financial goals, such as to limit spending on certain types of goods or services or based on other characteristics of the transactions.

At 216, the transaction record, including the supplemental information, may be provided to the account holder. For instance, the transaction record and other enhanced transaction detail may be made available to the account holder via an online banking area provided by the financial institution computer system 110. The account holder may access the enhanced transaction detail by selecting a transaction record from an online financial statement of the account holder. Examples of user interfaces that may be provided to the account holder by the financial institution computer system 110 are found in FIGS. 3-5, which are described in further detail below.

Figure 3:
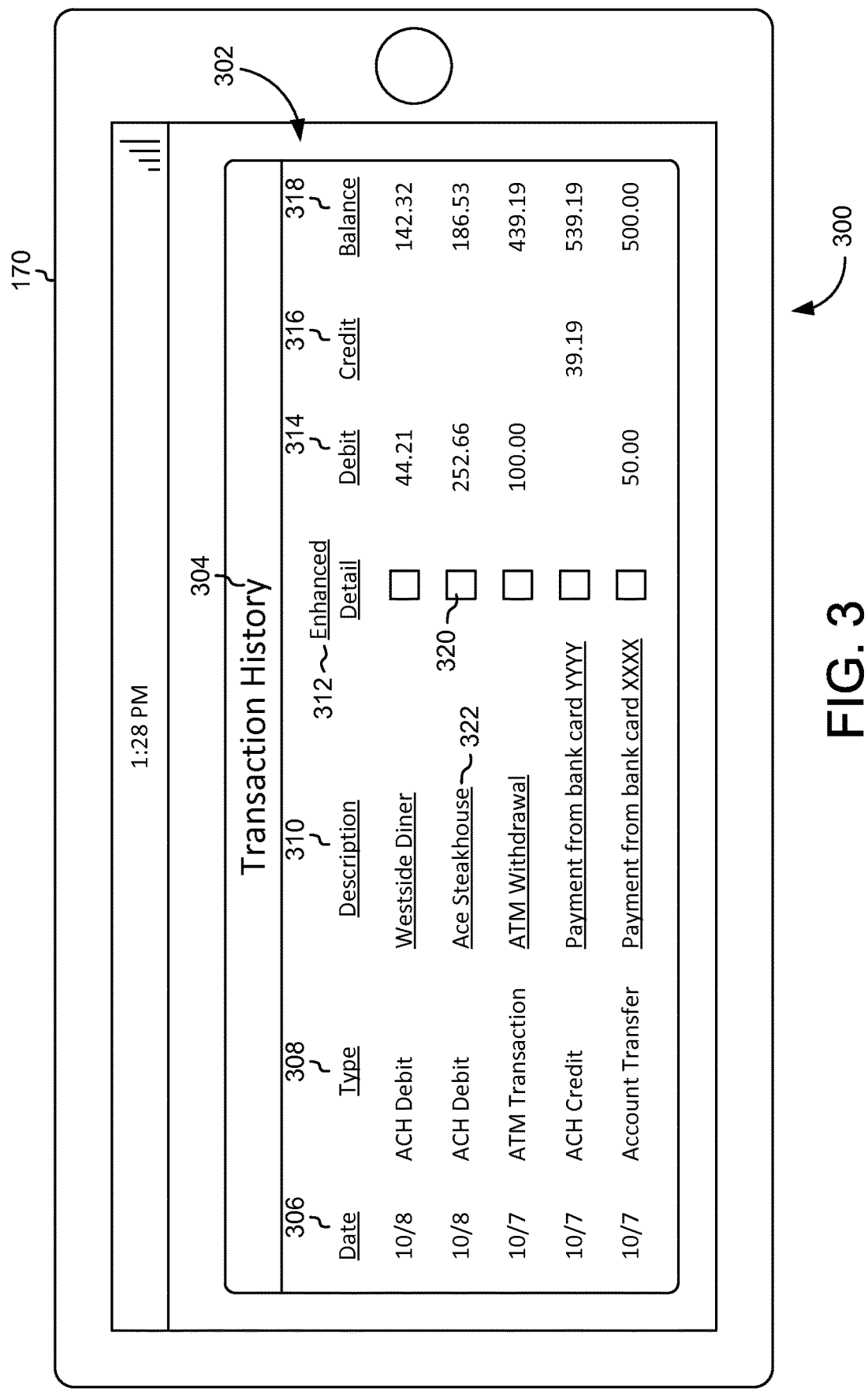
FIG. 3 is a user interface that may be presented on a display of an account holder computing device to enable the account holder to view transaction details for a financial account, according to an example embodiment.
Figure 4:
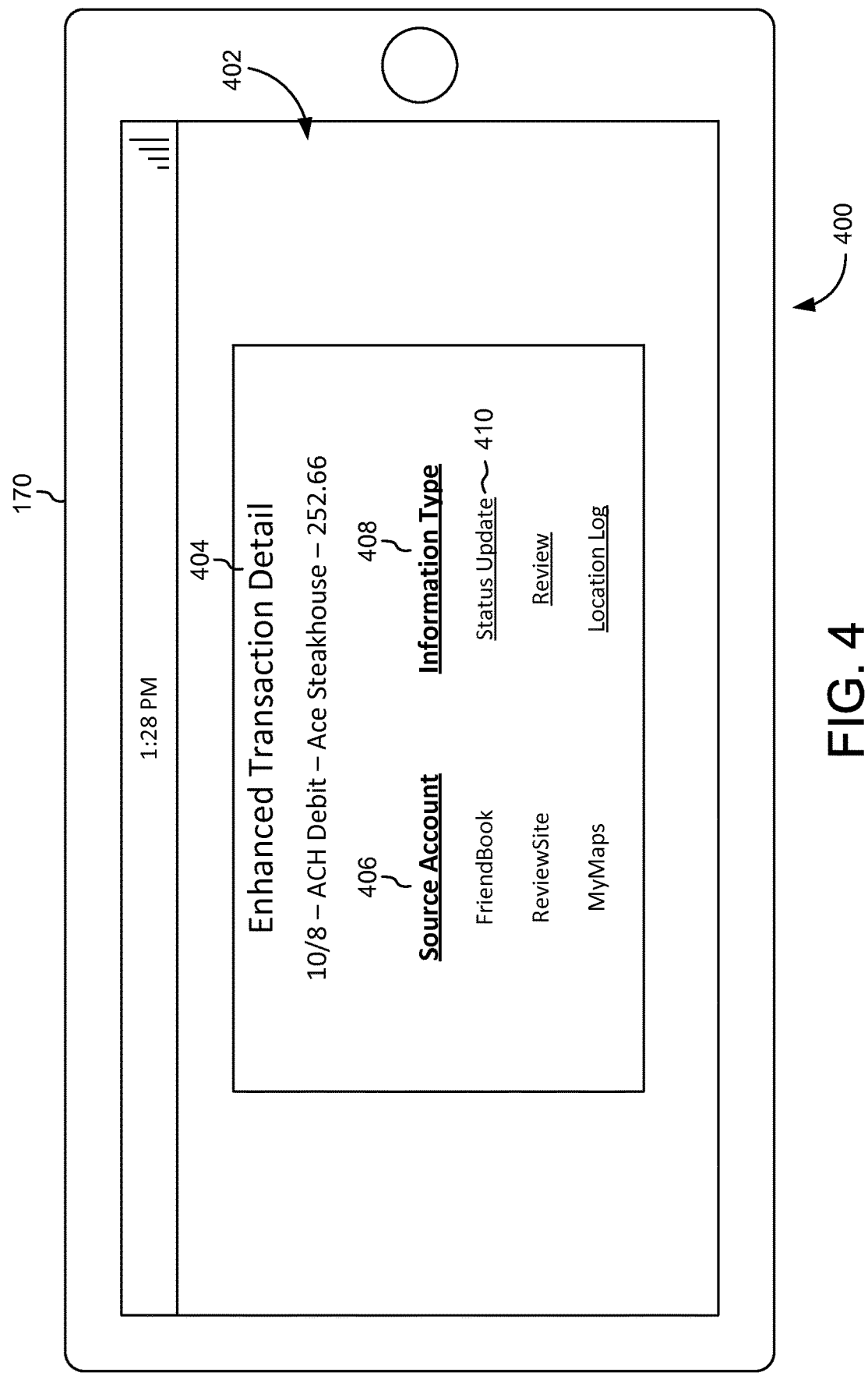
FIG. 4 is a user interface that may be presented on the display of the account holder computing device to display enhanced transaction detail for a financial transaction.

FIG. 3 shows a user interface 300 (i.e., user display) that may be presented to the account holder on a display of an account holder device (i.e., the account holder computer system 170). For instance, the user interface 300 may be provided to the account holder as part of a mobile banking application provided by the financial institution computer system 110. As shown on the user interface 300, the account holder can log into an online banking area 302 (e.g., website) provided by the financial institution computer system 110 to view the account holder's transaction history 304. The transaction history 304 may include identifying details for transactions performed by the account holder using an account provided (or otherwise maintained or tracked) by the financial institution computer system 110. In the example embodiment, the identifying details include a date 306, a transaction type 308, a description 310, enhanced detail indication 312, debit 314, credit 316, and ensuing balance 318. The account holder can access the enhanced transaction detail for a particular transaction by interacting with buttons such as button 320. The enhanced transaction detail may include all associated transaction information that was found in a secondary account. An example of the enhanced transaction detail is shown in FIG. 4. The account holder can also access the transaction record for a particular transaction by interacting with links such as link 322. The transaction record is intended to provide a full description of the transaction, and may also include information pulled from a secondary account. An example of a transaction record is shown in FIG. 5.

FIG. 4 shows another user interface 400 that may be presented to the account holder on the display of the account holder device (i.e., the account holder computer system 110). The user interface 400 may be accessed by interacting with button 320 of the user interface 300. As shown on the user interface 400, the account holder can access an enhanced transaction detail area 402, including a display of enhanced transaction detail 404 for the transaction occurring with "Ace Steakhouse." The transaction detail 404 includes identification of a source account 406 and the information type 408 for each piece of supplemental information found within a secondary account. The account holder can access the supplemental information by interacting with links such as link 410. By interacting with link 410, for instance, the account holder can access a status update associated with the transaction and found within a social networking site (e.g., "FriendBook"). Interacting with the link 410 may direct the account holder to the social networking site to view the status update (e.g., via an API connecting the financial institution computer system 110 with the social networking site). The financial institution computer system 110 may also provide the status update, or the information within the status update, to the user within the online banking area of the financial institution computer system 110. In the example embodiment, the account holder may also access a review associated with the transaction, and a location log associated with the transaction.

Figure 5:
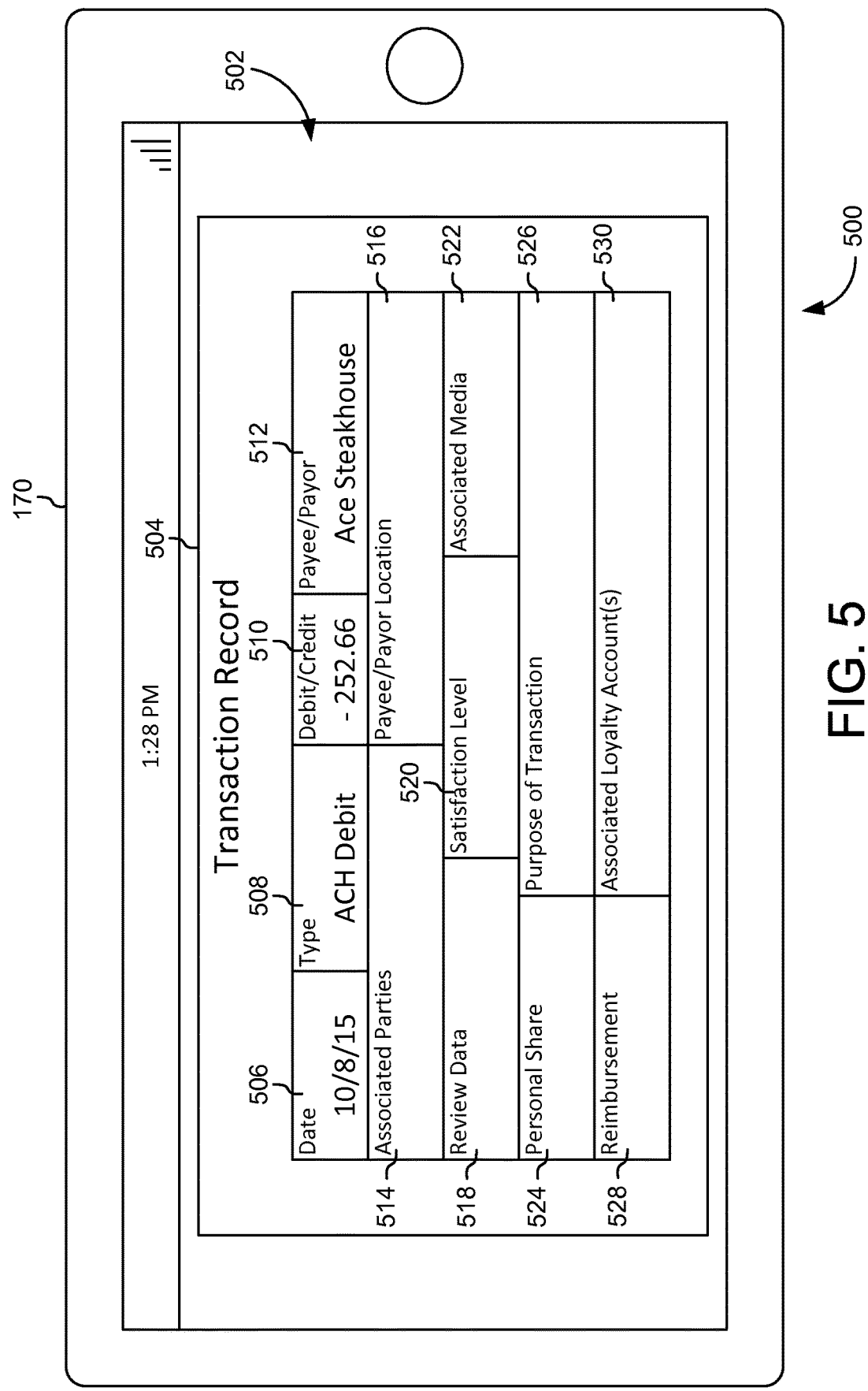
FIG. 5 is a user interface that may be presented on the display of the account holder computing device to display a transaction record for a financial transaction.

FIG. 5 shows another user interface 500 that may be presented to the account holder on the display of the account holder device (i.e., the account holder computer system 110). The user interface 500 may be accessed by interacting with link 322 of the user interface 300. As shown on the user interface 500, the account holder can access a transaction record area 502, including a display of a transaction record 504 for the transaction occurring with "Ace Steakhouse."

The transaction record 504 includes a template having fields for displaying transaction information. The fields may be provided by the financial institution computer system 110 (e.g., by default) and/or determined (e.g., selected) by the account holder. The fields of the transaction record 504 include date 506, transaction type 508, debit/credit amount 510, payee/payor information 512, associated parties 514, payee/payor location 516, review data 518, satisfaction level 520, associated media 522, personal share of the transaction 524, purpose of the transaction 526, reimbursement amount 528, and associated loyalty account(s) 530. The transaction record 504 may be generated by the record generation logic 134 when the transaction is initiated. The record generation logic 134 may at least partially populate the transaction record 504 with information received at the time the transaction is initiated. Supplemental information may then be added to the transaction record 504 when the information is received from a secondary account.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machines with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method comprising:

receiving, by a financial institution computer system comprising an application programming interface (API), from a web server of a merchant providing a dynamically-generated web page to a client device of an account holder, via network interface logic, transaction information for a financial transaction performed using a financial account held by the account holder;

generating, by the financial institution computer system, a transaction record for the financial transaction using the transaction information from the web server, the transaction record including a transaction amount, an account associated with the financial transaction, a merchant identifier, or location information for the financial transaction;

executing, by the financial institution computer system, the API to access, via the network interface logic, a social network account of the account holder that is stored on a cloud computing system and that is linked to the financial account such that the financial institution computer system is granted permanent access to the secondary account of the account holder, wherein the API enables the financial institution computer system to access the social network account directly through the cloud computing system maintaining the social network account;

searching, by the financial institution computer system, the social network account to identify, based on at least one of the transaction amount, the merchant identifier, or the location information about the financial transaction, one or more posts with words or images related to a review of at least one of a product or a merchant associated with the financial transaction;

analyzing, by the financial institution computer system, the one or more posts to identify phrases or facial expressions that the account holder typically associates with a positive or negative experience to determine satisfaction information for the financial transaction;

incorporating, by the financial institution computer system, the satisfaction information into the generated transaction record; and providing, by the financial institution computer system, through a mobile banking application provided by the financial institution computer system and running on the client device, a user interface presented on a display of the client device of the account holder, the user interface: (i) showing the transaction record with the transaction information and the satisfaction information, (ii) identifying a source for the satisfaction information, and (iii) presenting a selectable link configured to provide access, via the financial institution computer system executing the API, to the one or more posts found within the social network account and identified as being associated with the financial transaction.

2. The method of claim 1, further comprising:

aggregating, by the financial institution computer system, the transaction record with one or more other transaction records based on one or more characteristics of the financial transaction; and providing, by the financial institution computer system, via the mobile banking application provided by the financial institution computer system, the aggregated records to the account holder.

3. The method of claim 2, wherein the one or more characteristics are specified by the account holder.

4. The method of claim 2, wherein the one or more characteristics are determined based on a financial goal of the account holder.

5. The method of claim 1, wherein the satisfaction information includes an identifier of a second party associated with the financial transaction.

6. The method of claim 5, further comprising sending, by the financial institution computer system, a request to the second party for payment of at least a portion of the financial transaction based on the identifier of the second party.

7. The method of claim 5, further comprising generating, by the financial institution computer system, an expense report for the financial transaction, including the identifier of the second party associated with the financial transaction.

8. The method of claim 1, wherein identifying the satisfaction information includes matching at least a portion of the transaction information to information stored within the social networking account.

9. The method of claim 1, wherein incorporating the satisfaction information into the generated transaction record comprises further incorporating a receipt associated with the financial transaction into the generated transaction record.

10. The method of claim 9, wherein the receipt is access via an email account of the user.

11. A method, comprising:

receiving, by a financial institution computer system comprising an application programming interface (API), from a web server of a merchant providing a dynamically-generated web page to a client device of an account holder, via network interface logic, transaction information for a financial transaction performed using a financial account held by the account holder;

receiving, by the financial institution computer system from the client device of the account holder, financial record template information, wherein the financial record template information includes instructions to generate a financial record template modifiable by the account holder, wherein the financial record template is visible to the account holder via a graphical user interface that is displayed on the client device of the account holder;

generating, by the financial institution computer system, a transaction record for the financial transaction based on the transaction information by applying the transaction information to the record template, such that the transaction information populates one or more fields of the record template such that the transaction information is displayed via the graphical user interface;

determining, by the financial institution computer system, supplemental information that is required for the transaction record based on one or more open fields of the record template;

executing, by the financial institution computer system, the API to access, via the network interface logic, a social network account of the account holder that is stored on a cloud computing system maintaining the social network account;

searching, by the financial institution computer system, the social network account to identify, based on at least one of the transaction amount, the merchant identifier, or the location information about the financial transaction, wherein identifying the supplemental information includes matching the transaction information to similar information stored within the social network account, and identifying the supplemental information as being associated with the matching information;

importing, by the financial institution computer system, using the API of the social network site, the supplemental information with the generated transaction record by applying the supplemental information to the one or more open fields of the record template, such that the supplemental information populates the one or more open fields of the record template; and providing, by the financial institution computer system, through a mobile banking application provided by the financial institution computer system and running on the client device, a user interface presented on a display of the client device of the account holder, the user interface: (i) showing the transaction record with the transaction information and the supplemental information, (ii) identifying a source for the supplemental information, and (iii) presenting a selectable link configured to provide access, via the financial institution computer system executing the API, to one or more posts found within the social network account and identified as being associated with the supplemental information.

12. The method of claim 11, wherein the supplemental information is specified by the account holder using the mobile banking application provided by the financial institution computer system and running on the client device.

13. The method of claim 11, wherein the social network account is linked to the financial account used in the financial transaction, and can be accessed via the financial institution computer system via the API of the social network site.

14. The method of claim 11, wherein other portions of the supplemental information is retrieved from one or more secondary accounts of the account holder, the one or more secondary accounts including at least one non-financial account.

15. The method of claim 11, wherein the supplemental information includes an update posted to the social networking account of the account holder by the account holder via one or more social network applications executing on the client device.

16. A method, comprising:

receiving, by a financial institution computer system comprising an application programming interface (API), from a web server of a merchant providing a dynamically-generated web page to a client device of an account holder, via network interface logic, transaction information for a financial transaction performed using a financial account held by the account holder;

generating, by the financial institution computer system, a transaction record for the financial transaction based on the transaction information from the web server, the transaction record including a transaction amount, an account associated with the transaction, a merchant identifier, or location information about the financial transaction;

executing, by the financial institution computer system, the API to transmit a request to access a social network account of the account holder;

executing, by the financial institution computer system, responsive to transmitting the request to access the social network account, the API to access, via the network interface logic, a social network account of the account holder, wherein the API enables the financial institution computer system to access the social network account directly through the cloud computing system maintaining the social network account;

searching, by the financial institution computer system, the social network account to identify supplemental information for the financial transaction based on at least one of the transaction amount, the merchant identifier, or the location information about the financial transaction, wherein the supplemental information includes a receipt associated with the financial transaction;

receiving, by the financial institution computer system, a confirmation message from the client device of the account holder that indicates that the supplemental information is related to the generated transaction record;

importing, by the financial institution computer system, the supplemental information for inclusion in the generated transaction record;

identifying, by the financial institution computer system, using the API, a second person having a second social network account associated with the financial transaction, based on the supplemental information for the financial transaction and a social media post in which the social network account of the account holder is tagged and in which the second social network account of the second person is tagged;

importing, by the financial institution computer system, information from the second social network account of the second person to the transaction record, such that the information from the second social network account of the second person populates one or more fields of the transaction record; and providing, by the financial institution computer system, through a mobile banking application provided by the financial institution computer system and running on the client device, a user interface presented on a display of the client device of the account holder, the user interface: (i) showing the transaction record with the transaction information, the supplemental information, and the information from the second social network account, (ii) identifying a source for the supplemental information and the second social network account, and (iii) presenting a selectable link configured to provide access, via the financial institution computer system executing the API, to one or more posts found within the social network account and identified as being associated with the supplemental information.

17. The method of claim 16, further comprising generating, by the financial institution computer system, an expense report including the transaction record and an identification of the second social network account.

18. The method of claim 16, further comprising identifying, by the financial institution computer system, using facial recognition software, a set of emotions associated with the financial transaction from the one or more posts found within the social network account and identified as being associated with the supplemental information, the one or more posts comprising images including a face of the account holder.

19. The method of claim 16, further comprising contacting, by the financial institution computer system via the API accessing the second social network account of the second person, the second person by transmitting a request that the second person provide additional information related to the financial transaction.

* * * * *